3,458,636
METHOD FOR COMBATING MICRO-ORGANISMS

Cyril Woolf, Morristown, N.J., and Rebecca H. Wood, Silver Spring, Md., assignors to Allied Chemical Corporation, New York, N.Y., a corporation of New York
No Drawing. Filed Aug. 7, 1967, Ser. No. 658,593
Int. Cl. A61k 27/00; A61l 13/00; C07d 3/00
U.S. Cl. 424—278      4 Claims

ABSTRACT OF THE DISCLOSURE

This specification discloses a method for destroying micro-organisms by subjecting them to the vapors of one or more bis(perhalofluoromethyl)-3,4-difluorooxetenes. The effectiveness of the bis(perhalofluoromethyl)-3,4-difluorooxetene biocides is enhanced in the presence of moisture. Typically, vapors of 2,2-bis(trifluoromethyl)-3,4 - difluorooxetene evaporated in air at 90% R.H. destroys *Staphylococcus aureus* bacteria rapidly and completely.

---

The usual methods of sterilization, such as use of steam, heat, chemical solution, radiation and the like, are often impractical when large areas such as hospital rooms, laboratories and animal quarters are to be sterilized. This may be true also when sterilization of articles which may be adversely affected by moisture or heat, such as delicate laboratory and medical equipment, or fabrics, plastics and the like, are required. Sterilization problems of this kind can frequently be overcome by using chemical antimicrobial agents in vapor phase to produce sterilization. Effective vapor phase chemical antimicrobial agents must be capable of being readily introduced into the area to be treated; of rapidly and thoroughly penetrating all porous surfaces in the area; of effectively penetrating the micro-organisms to be treated and of controlling them, i.e. by destroying them or by inhibiting their propagation, at normal temperatures and relative humidities and of being readily removed by aeration.

According to the method of the present invention, microorganisms can be controlled by treating them with a 2,2-bis(perhalofluoromethyl)-3,4-difluorooxetene having the formula:

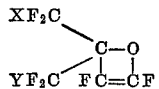

wherein X and Y can be the same or different and represent fluorine and chlorine, in vapor phase.

The 2,2 - bis(perhalofluoromethyl) - 3,4 - difluorooxetenes of the invention, hereinafter referred to as the subject oxetenes and methods for preparing them, have been disclosed in Belgian Patent No. 671,439, filed Oct. 26, 1965 by Hollander and Woolf.

The subject oxetenes can be introduced into the area to be sterilized in liquid form and allowed to penetrate the area by evaporation. Alternatively, they can be admixed with a diluent inert gas or mixture of gases. As an example, air can be bubbled through the liquid subject oxetenes and the oxetene-laden air passed into the area to be treated. The subject oxetene can also be admixed with a suitable propellent mixture and sprayed into the area. The subject oxetenes, individually or mixtures of any of them, can be employed as the active ingredient in combating micro-organisms, or if desired, one or more can be used with other known vapor phase antimicrobial agents such as ethylene oxide. In addition to a vapor diluent, the subject oxetenes can be used with other vaporizable components such as perfumes, deodorants, water vapor and the like.

As is known in the prior art, the dosages of a chemical antimicrobial agent required to produce control can vary widely depending upon the particular micro-organisms to be controlled, the size of the area to be treated, the time within which it is desired to effect control and environmental conditions such as temperature, relative humidity, etc. As is the case with other vapor phase antimicrobial agents, the effectiveness of the subject oxetenes increases with an increase in relative humidity. In the preferred method of practicing the invention, water vapor is present in the area to be sterilized in an amount equivalent to at least about 90% relative humidity when the subject oxetene vapor is introduced. A sufficient amount of the subject oxetene is employed so as to provide the desired toxicity. The dosages that will be required to sterilize a particular area to ensure control of micro-organisms can be readily ascertained, as will be known to one skilled in the art.

The following examples will serve to further illustrate the invention, but it is to be understood that the invention is not to be limited to the details described therein. In the examples all parts and percentages are by weight unless otherwise noted.

EXAMPLE 1

Preparation of 2,2-bis(trifluoromethyl)-3,4-difluorooxetene

A solution containing 159 parts of 2,2-bis(trifluoromethyl) - 3,4 - dichloro - 3,4 - difluorooxetane in 143 parts of absolute methanol was added over a 50 minute period to a stirred suspension of 330 parts of zinc and 1 part of cupric chloride in 31.7 parts of absolute methanol. The mixture was maintained at a temperature of 40–55° C. during the addition and for an additional two hours. After allowing to stand overnight, the mixture was heated at reflux temperature for 1.25 hours, and then the volatile product was distilled from the reaction mixture and collected in a Dry Ice trap. The product was then fractionally distilled.

112 parts (92.6% yield) of 2,2-bis(trifluoromethyl)-3,4-difluorooxetene was obtained as a colorless liquid having a boiling point of 21–22° C. It was 99% pure based on vapor phase chromatographic analysis. The structure was confirmed by infrared analysis.

EXAMPLE 2

0.1 ml. portions of 2,2-bis(trifluoromethyl)-3,4-difluorooxetene, as prepared above, were charged to a one-liter flask containing air of a predetermined relative humidity. Circular patches of cotton cloth, each having an area of about 2 cm.$^2$ and impregnated with an aqueous suspension of about $5 \times 10^6$ *Staphylococcus aureus* cells and subsequently dried were suspended by wires about halfway down into the flasks. The flasks were stoppered and the contaminated patches exposed to the test oxetene vapor for periods of 1, 4 and 24 hours. At the end of the exposure periods, the patches were removed and assayed for viable organisms as follows: the patches were placed in dilution blanks composed of an aqueous solution of 0.1% by volume of lecithin and 0.71% by volume of a suitable emulsifier which in this case was a polyoxyethylene derivative of fatty acid partial esters of hexitol anhydrides available as Tween 80 from Atlas Powder Company and the solution was adjusted to pH 7.0 with 1 N sodium hydroxide. Organisms remaining on the patch were dislodged by shaking and aliquots were plated in enriched nutrient agar. After incubating for 48 hours at 37° C., the percentage of organisms killed by the test oxetene was calculated by comparison of the numbers found after exposure with an assay of unexposed contaminant patches. Bacteria counts were made with a Quebec Colony counter. After 4 hours exposure at 90% relative humidity, 100% of the *Staphylococcus aureus* cells were killed.

EXAMPLE 3

The procedure as in Example 2 is repeated using 2-trifluoromethyl - 2 - chlorodifluoromethyl - 3,4 - difluorooxetene prepared according to the procedure set forth in Example 1, but using the appropriate oxetane starting material. A comparable bactericidal effect is noted.

It will be apparent that many modifications and variations may be effected without departing from the scope of the novel concepts of the present invention, and the illustrative details disclosed are not to be construed as imposing limitations on the invention.

We claim:
1. A method for combating bacteria which comprises treating said bacteria with an effective amount of a 2,2-bis(perhalofluoromethyl) - 3,4 - difluorooxetene having the formula:

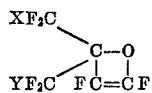

wherein X and Y can be the same or different and represent chlorine and fluorine, in vapor phase.

2. A method according to claim 1 wherein said 2,2-bis(perhalofluoromethyl) - 3,4 - difluorooxetene is employed in the presence of water vapor.

3. A method according to claim 2 wherein said 2,2-bis(perhalofluoromethyl) - 3,4 - difluorooxetene is 2,2-bis(trifluoromethyl) - 3,4 - difluorooxetene.

4. A method according to claim 3 wherein said bacteria is *Staphylococcus aureus* cells.

References Cited

UNITED STATES PATENTS 3,167,477   1/1965   Gump et al. _____ 21—58 XR
3,346,592   10/1967  Dunbar _____ 424—278 XR MORRIS O. WOLK, Primary Examiner D. G. MILLMAN, Assistant Examiner U.S. Cl. X.R.

21—53, 58; 260—333; 424—350